(12) United States Patent
Sim et al.

(10) Patent No.: US 12,445,598 B2
(45) Date of Patent: Oct. 14, 2025

(54) METHOD AND APPARATUS FOR VIDEO CODING BASED ON MAPPING

(71) Applicants: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(72) Inventors: Dong Gyu Sim, Seoul (KR); Joo Hyung Byeon, Seoul (KR); Sea Nae Park, Seoul (KR); Seung Wook Park, Yongin-si (KR)

(73) Assignees: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(*) Notice: Subject to any disclaimer, the term of this patent is extended or adjusted under 35 U.S.C. 154(b) by 92 days.

(21) Appl. No.: 18/244,691

(22) Filed: Sep. 11, 2023

(65) Prior Publication Data
US 2023/0421753 A1    Dec. 28, 2023

Related U.S. Application Data

(63) Continuation of application No. PCT/KR2022/004170, filed on Mar. 24, 2022.

(30) Foreign Application Priority Data

Mar. 31, 2021 (KR) .................. 10-2021-0041882
Mar. 23, 2022 (KR) .................. 10-2022-0036240

(51) Int. Cl.
H04N 19/105     (2014.01)
H04N 19/11      (2014.01)
(Continued)

(52) U.S. Cl.
CPC .......... *H04N 19/105* (2014.11); *H04N 19/11* (2014.11); *H04N 19/176* (2014.11); *H04N 19/82* (2014.11); *H04N 19/86* (2014.11); *H04N 19/91* (2014.11)

(58) Field of Classification Search
CPC .... H04N 19/105; H04N 19/11; H04N 19/176; H04N 19/82; H04N 19/86; H04N 19/91;
(Continued)

(56) References Cited

U.S. PATENT DOCUMENTS 9,100,661 B2   8/2015   Alshina et al.
9,681,142 B2   6/2017   Ma et al.
(Continued)

FOREIGN PATENT DOCUMENTS

JP   2019004360 A    1/2019
KR   101527148 B1    6/2015
(Continued)

OTHER PUBLICATIONS

International Search Report and Written Opinion cited in corresponding international app No. PCT/KR2022/004170; Jul. 13, 2022; 9 pp.

*Primary Examiner* — Boubacar Abdou Tchoussou
(74) *Attorney, Agent, or Firm* — Lempia Summerfield Katz LLC

(57) ABSTRACT

A method and an apparatus for video coding based on mapping are disclosed. The video coding method and the apparatus generate a prediction block of a current block with reference to a mapped image when a video encoding apparatus transmits mapping data related to a mapping of the image and a video decoding apparatus decodes the current block based on the mapping data.

17 Claims, 11 Drawing Sheets

(51) Int. Cl.
*H04N 19/176* (2014.01)
*H04N 19/82* (2014.01)
*H04N 19/86* (2014.01)
*H04N 19/91* (2014.01)

(58) Field of Classification Search
CPC .... H04N 19/114; H04N 19/117; H04N 19/13; H04N 19/593; H04N 19/423
See application file for complete search history.

(56) References Cited

U.S. PATENT DOCUMENTS

| | | |
|---|---|---|
| 10,419,779 B2 | 9/2019 | Yoo et al. |
| 2011/0243232 A1 | 10/2011 | Alshina et al. |
| 2011/0293013 A1 | 12/2011 | Ma et al. |
| 2016/0337665 A1 | 11/2016 | Yoo et al. |
| 2018/0367806 A1 | 12/2018 | Mochizuki et al. |
| 2019/0327477 A1* | 10/2019 | Ramasubramonian ... G06T 5/90 |
| 2020/0029096 A1* | 1/2020 | Rusanovskyy ........ H04N 19/52 |
| 2020/0162736 A1* | 5/2020 | Seok ................... H04N 19/124 |

FOREIGN PATENT DOCUMENTS

| | | |
|---|---|---|
| KR | 101660558 B1 | 9/2016 |
| KR | 101710623 B1 | 3/2017 |
| KR | 20170069957 A | 6/2017 |

* cited by examiner

METHOD AND APPARATUS FOR VIDEO CODING BASED ON MAPPING

CROSS-REFERENCE TO RELATED APPLICATIONS

This application is a Continuation of International Application No. PCT/KR2022/004170 filed on Mar. 24, 2022, which claims priority to Korean Patent Application No. 10-2021-0041882 filed on Mar. 31, 2021, and Korean Patent Application No. 10-2022-0036240 filed on Mar. 23, 2022, the entire disclosures of each of which are incorporated herein by reference.

TECHNICAL FIELD

The present disclosure relates to a mapping-based video encoding method and an apparatus.

BACKGROUND

The statements in this section merely provide background information related to the present disclosure and do not necessarily constitute prior art.

Since video data has a large amount of data compared to audio or still image data, the video data requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required. In particular, where sample values composing the video have diverse distributions, the absolute value of the prediction error may increase, which can degrade the encoding performance. Additionally, different distributions of the reference samples from a distribution of the encoded samples may also degrade the performance of the prediction. Therefore, there is a need to provide a method of dealing with diverse distributions of sample values in terms of image quality improvement and coding efficiency.

SUMMARY

The present disclosure seeks to provide a video coding method and an apparatus for generating a prediction block of the current block with reference to a mapped image when a video encoding apparatus transmits mapping data related to a mapping of the image and a video decoding apparatus decodes a current block based on the mapping data.

At least one aspect of the present disclosure provides a video decoding apparatus. The apparatus includes an entropy decoder configured to decode a prediction mode of an intra prediction of a current block, or to decode a reference picture index and a motion vector of an inter prediction from a bitstream, and then decode a residual block and mapping data of the current block from the bitstream. The apparatus also includes a mapper configured to map a reference picture from an original range to a mapping range by using the mapping data. The reference picture is selected based on the reference picture index from reference images. The apparatus also includes a predictor configured to generate a prediction block of the current block by applying the prediction mode to previously reconstructed blocks and performing the intra prediction or by applying the motion vector to a mapped reference picture and performing the inter prediction. The apparatus also includes an adder configured to sum the prediction block and the residual block to generate a reconstructed block to be included in a reconstructed image. The apparatus also includes an inverse mapper configured to inversely map the reconstructed image from the mapping range to the original range by using inverse mapping data corresponding to the mapping data. The apparatus also includes a loop filter unit configured to perform loop filtering on an inversely mapped reconstructed image. The loop filtering includes a deblocking filter and an offset filter. The apparatus also includes a memory configured to store a filtered reconstructed image as included in the reference image Another aspect of the present disclosure provides a video decoding method performed by a computing device. The video decoding method includes decoding a prediction mode of an intra prediction of a current block, or decoding a reference picture index and a motion vector of an inter prediction from a bitstream, and then decoding a residual block and mapping data of the current block from the bitstream. The video decoding method also includes selecting a reference picture from reference images stored in a memory by using the reference picture index, and mapping the reference picture from an original range to a mapping range by using the mapping data. The video decoding method also includes generating a prediction block of the current block by applying the prediction mode to previously reconstructed blocks and performing the intra prediction, or by applying the motion vector to a mapped reference picture and performing the inter prediction. The video decoding method also includes generate a reconstructed block to be included in a reconstructed image by summing the prediction block and the residual block. The video decoding method also includes inversely mapping the reconstructed image from the mapping range to the original range by using inverse mapping data corresponding to the mapping data. The method also includes applying loop filtering to an inversely mapped reconstructed image. The video decoding method also includes storing in the memory a filtered reconstructed image as included in the reference images.

Yet another aspect of the present disclosure provides a video encoding method performed by a computing device. The video encoding method includes obtaining a prediction mode of an intra prediction of a current block, or obtaining a reference picture index and a motion vector of an inter prediction from a high level, and then obtaining mapping data of the current block from the high level. The video encoding method also includes mapping from an original range to a mapping range by using the mapping data, for the current block. The video encoding method also includes selecting a reference picture from reference images stored in a memory by using the reference picture index, and mapping the reference picture from an original range to a mapping range by using the mapping data. The video encoding method also includes generating a prediction block of the current block by applying the prediction mode to previously reconstructed blocks and performing the intra prediction, or by applying the motion vector to a mapped reference picture and performing the inter prediction. The video encoding method also includes generating a residual block by subtracting the prediction block from the current block, generating a bitstream by encoding the residual block, generating a reconstructed residual block from the residual block, and generating a reconstructed block included in a reconstructed image by summing the reconstructed residual block and the prediction block. The video encoding method also includes inversely mapping the reconstructed image from the mapping range to the original range by using inverse mapping data corresponding to the mapping data. The video encoding method also includes applying loop filtering to an inversely mapped reconstructed image. The video encoding method also includes storing in the memory a filtered reconstructed image as included in the reference images.

As described above, the present disclosure provides a video coding method and an apparatus for generating a prediction block of a current block with reference to a mapped image when a video encoding apparatus transmits mapping data related to a mapping of the image and a video decoding apparatus decodes the current block based on the mapping data. This improves image quality and improves encoding efficiency.

DETAILED DESCRIPTION

Figure 1:
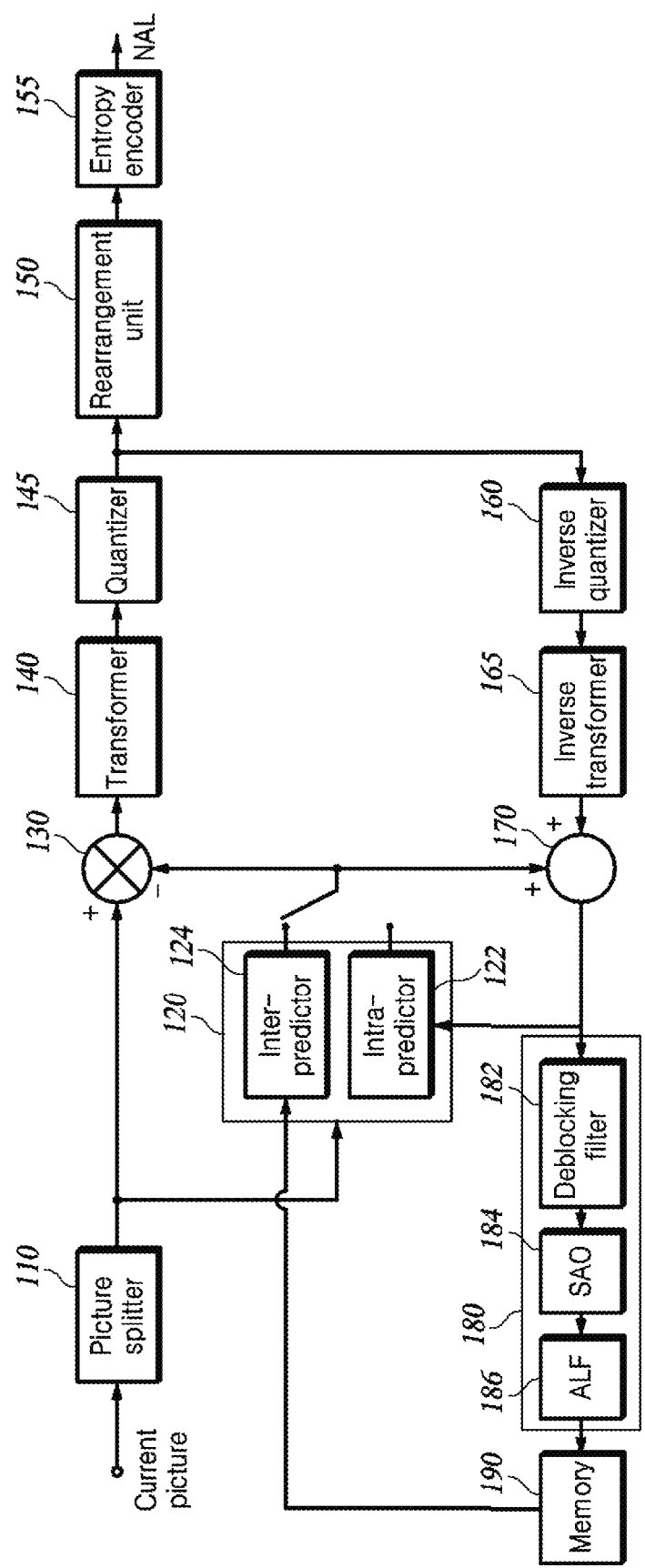
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions where considered to obscure the subject of the present disclosure have been omitted for the purpose of clarity and for brevity.

FIG. 1 is a block diagram of a video encoding apparatus that may implement technologies of the present disclosure.

Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
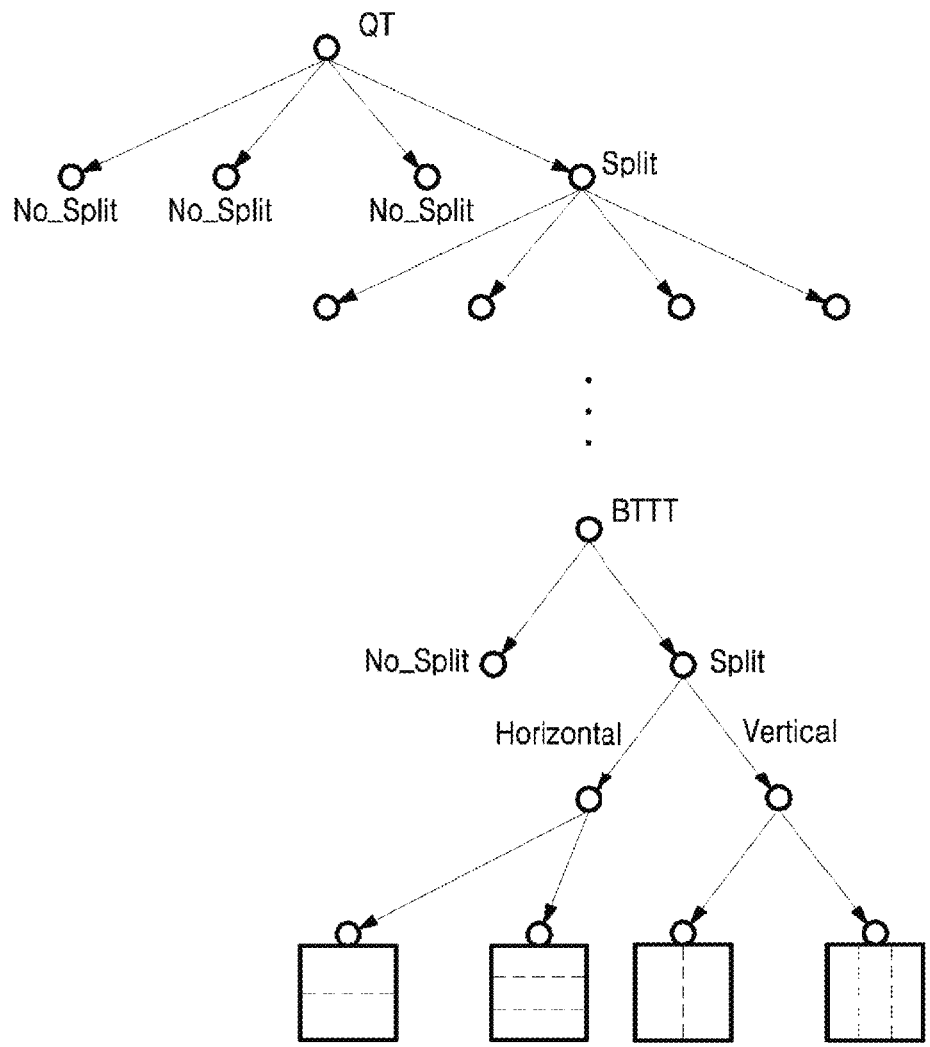
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
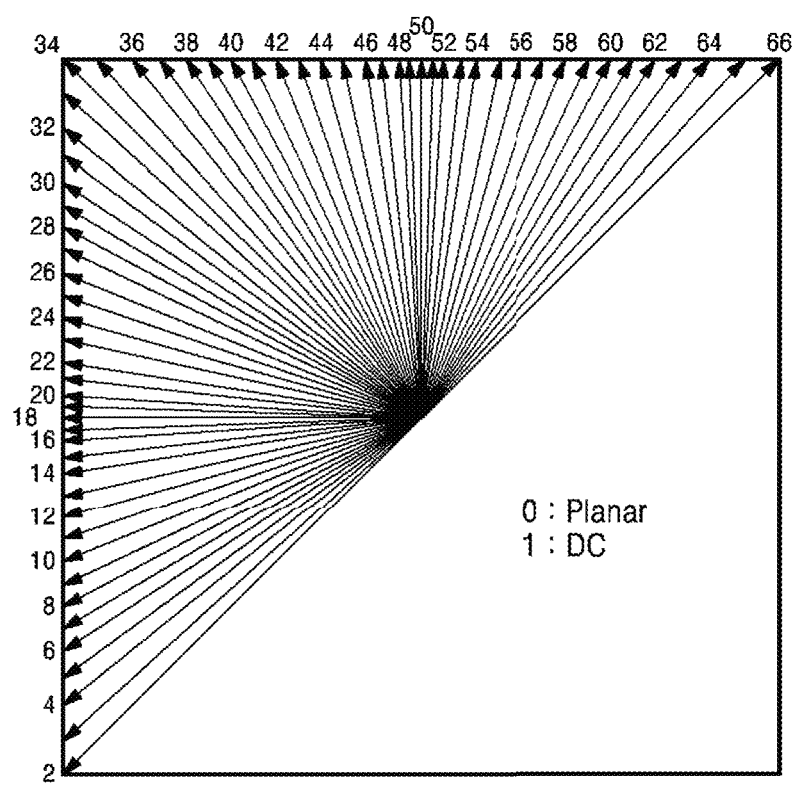
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
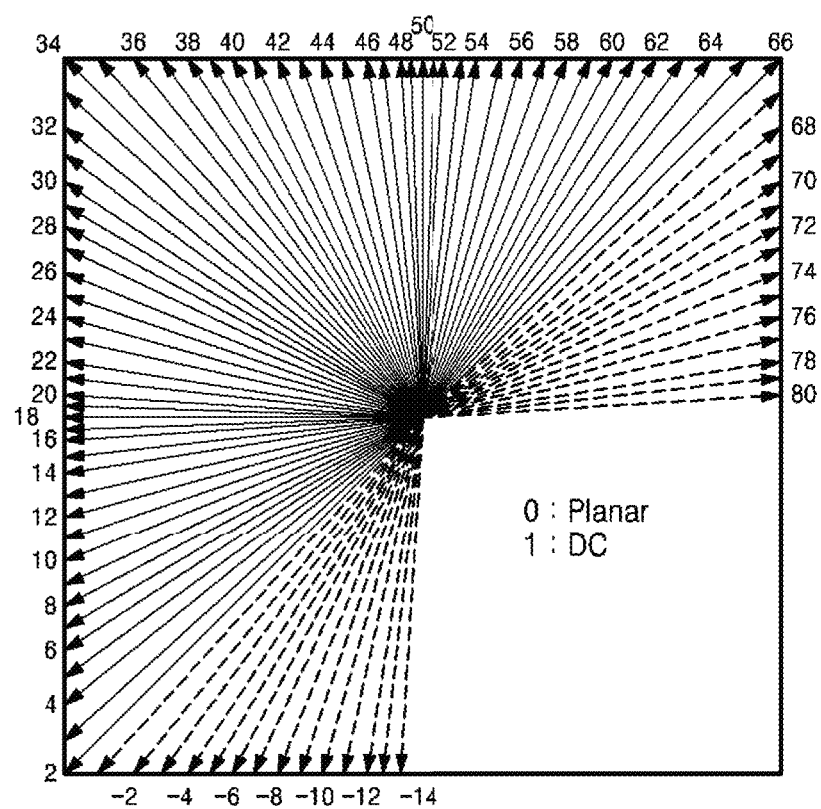

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded. e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-restored pictures, and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
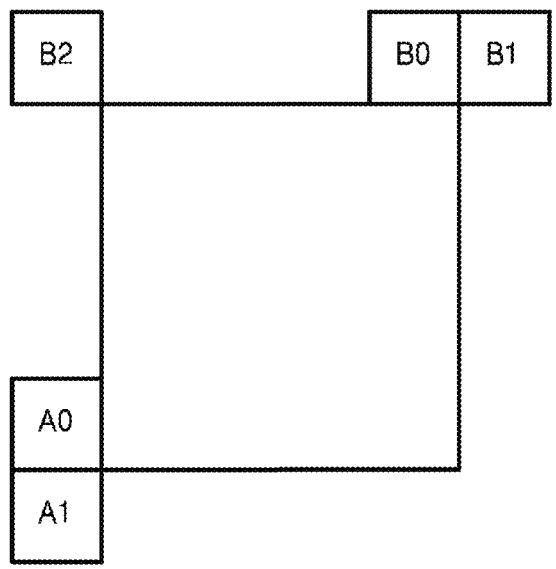
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block may be used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the restored pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
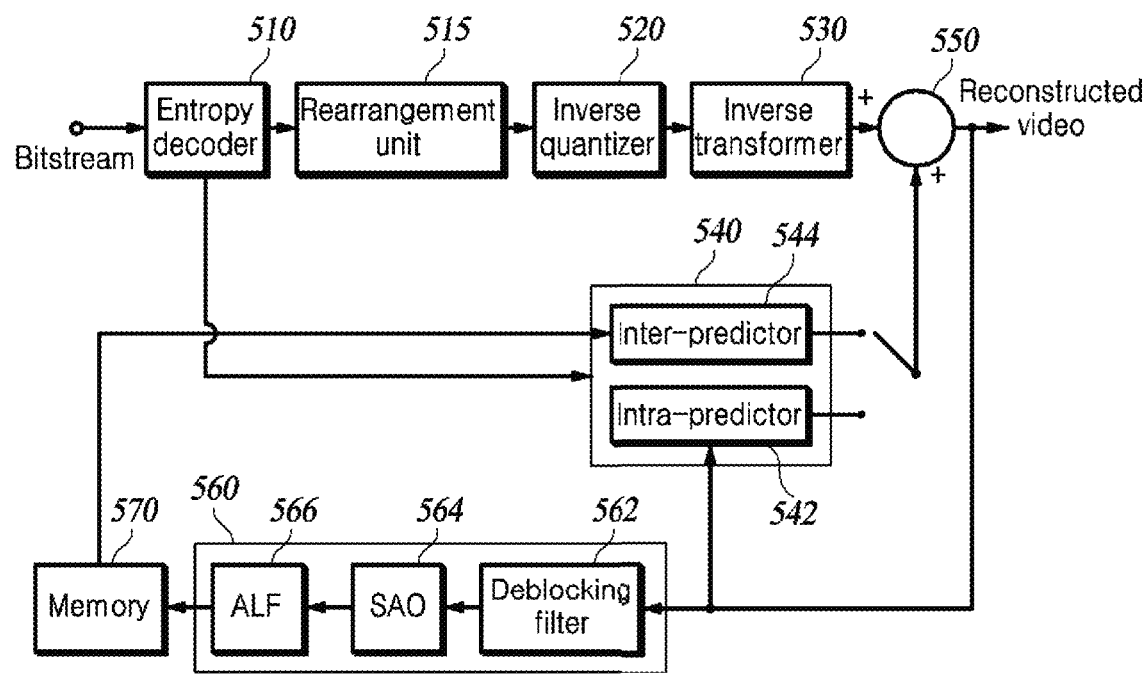
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transformer 530 and the prediction block output from the inter predictor 544 or the intra predictor 542. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate differences between the restored pixels and original pixels, which occur due to lossy coding. The filter coefficients of the ALF are determined by using information on filter coefficients decoded from the bitstream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

The present disclosure in some embodiments relates to encoding and decoding video images as described above. More specifically, the present disclosure provides a video coding method and an apparatus for generating a prediction block of a current block with reference to a mapped image when a video encoding apparatus transmits mapping data related to a mapping of the image and a video decoding apparatus decodes the current block based on the mapping data.

Hereinafter, the CU may be used to mean a unit of encoding or may be used to as a unit of decoding.

Figure 6:
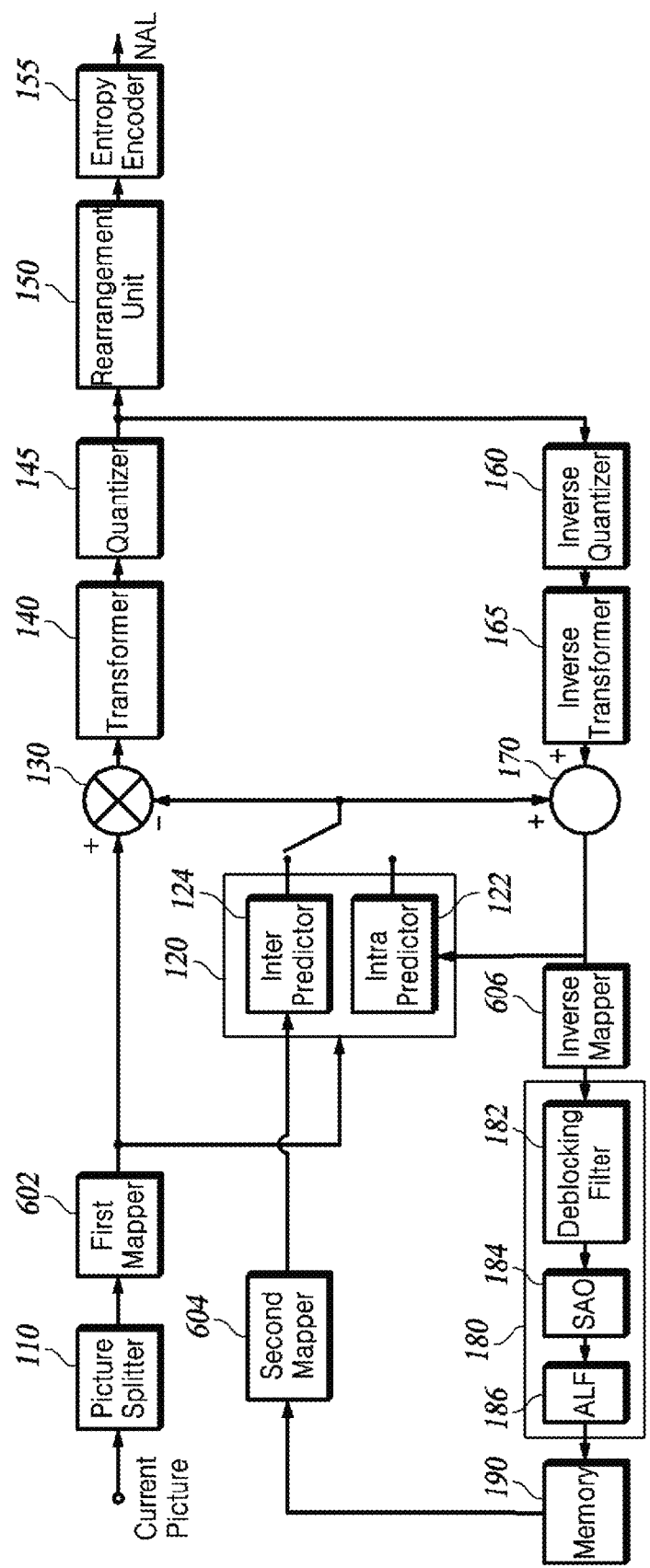
FIG. 6 is a block diagram conceptually illustrating a mapping-based video encoding apparatus, according to at least one embodiment of the present disclosure.

FIG. 6 is a block diagram conceptually illustrating a mapping-based video encoding apparatus, according to at least one embodiment of the present disclosure.

The video encoding apparatus according to the present embodiment performs adaptive mapping of luma and chroma samples and performs encoding of the current block by using the mapped luma and chroma samples. Further to the components included in the embodiment illustrated in FIG. 1, the video encoding apparatus may include a first mapper 602, a second mapper 604, and an inverse mapper 606. The following discussion focuses on components that are related to mapping-based encoding or add functionality.

In response to the current block in the current image, the first mapper 602 utilizes a mapping relationship to map sample values in the original range to sample values in the mapping range. Here, the original range represents a range that includes sample values in the original image, and the mapping range corresponds to the original range and is generated by the mapping relationship. The mapped current block may be transferred to the predictor 120 for intra/inter prediction or to the subtractor 130 for generation of a residual block, as illustrated in FIG. 6.

For a reference picture, the second mapper 604 utilizes the mapping relationship to map reference samples to sample values in the mapping range. Since encoding of each picture may be performed by using a different mapping relationship, the mapping may utilize the mapping relationship that was used to encode the reference picture. Thus, the mapping relationship applied to the reference picture may be different from the mapping relationship applied to the current block.

The mapped reference picture is transferred to the inter predictor 124. Using a motion prediction and compensation process, the inter predictor 124 searches for the prediction block of the current block within the reference picture. As mentioned above, the motion vector corresponds to the displacement between the current block and the prediction block.

The sample values in the mapping range generated by the first mapper 602 and the second mapper 604 are used by the transformer 140, the quantizer 145, the entropy encoder 155, the inverse quantizer 160, the inverse transformer 165, and the predictor 120, as illustrated in FIG. 6.

In response to the reconstructed block generated by the adder 170, the inverse mapper 606 inversely maps the reconstructed sample values to the sample values in the original range by using an inverse mapping relationship that is the reversal of the mapping relationship described above.

The sample values in the original range generated by the inverse mapper 606 are used by the loop filter unit 180 and the memory 190, as illustrated in FIG. 6.

Meanwhile, the mapping relationship and the inverse mapping relationship used in the video encoding apparatus may be transferred therefrom to the video decoding apparatus for decoding the current block.

In the following description, the sample values in the original range may be used interchangeably with the original sample values, and the sample values in the mapping range may be used interchangeably with the mapping sample values. Further, intervals in the original range may be used interchangeably with the original intervals, and intervals in the mapping range may be used interchangeably with the mapping intervals. Hereinafter, the number of original intervals may be expressed simply as the number of intervals.

Hereinafter, Table 1, Table 2, and Table 3 are used to describe mapping relationships utilized by the video encoding apparatus and the video decoding apparatus.

Figure 7:
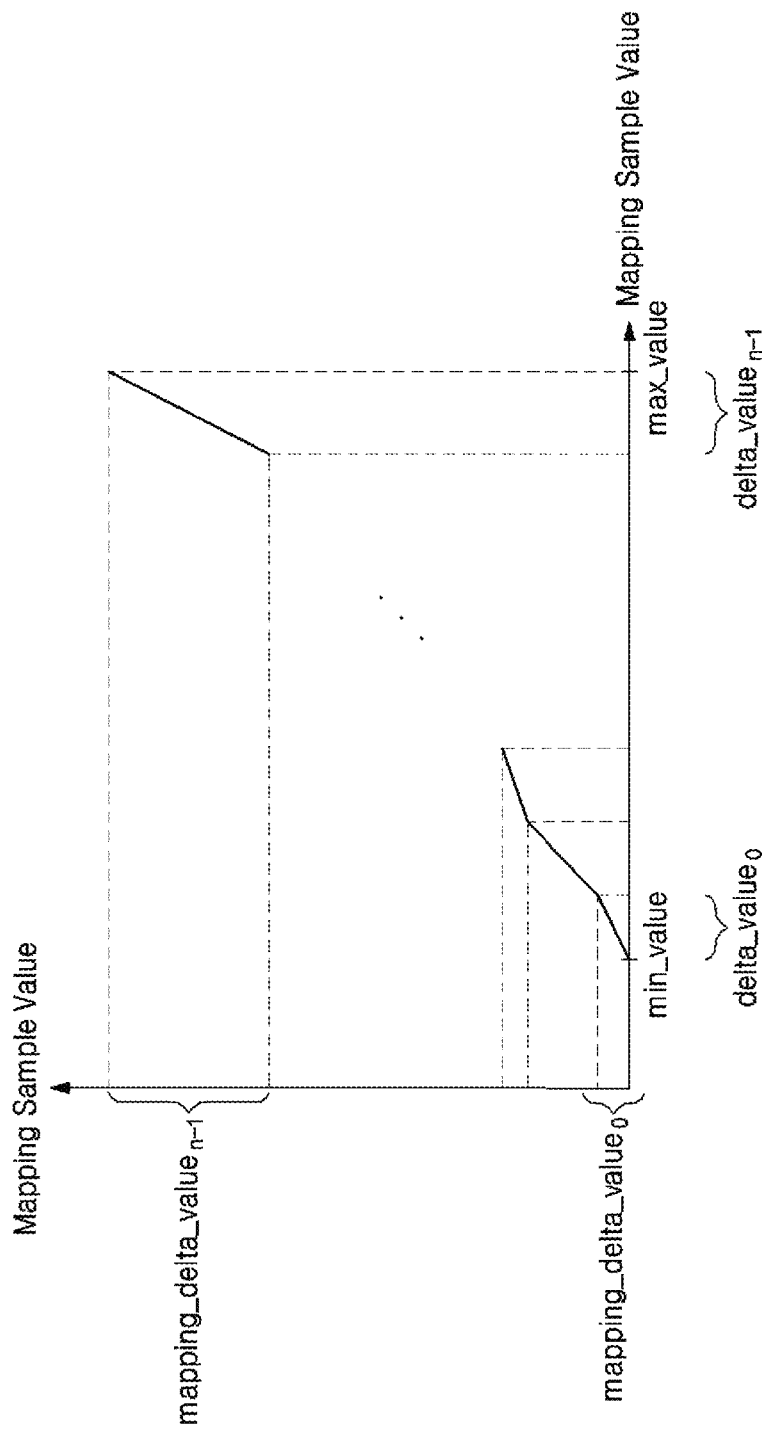
FIG. 7 is a diagram illustrating a mapping relationship according to at least one embodiment of the present disclosure.

FIG. 7 is a diagram illustrating a mapping relationship according to at least one embodiment of the present disclosure.

The video encoding apparatus may determine a mapping relationship for a current image between an original sample and a mapping sample, such as the example in FIG. 7, and may transmit the determined mapping relationship to the video decoding apparatus. On the other hand, where the mapping relationship is a preset relationship based on an agreement between the video encoding apparatus and the video decoding apparatus, transmission of the mapping relationship may be omitted. Further, if the mapping relationship changes adaptively, but the video decoding apparatus may determine the mapping relationship without additional information based on the decoding conditions, the transmission of the mapping relationship may be omitted.

The video encoding apparatus may transmit the mapping relationship at various levels, such as CU, CTU, tile, slice, picture, picture unit, subpicture, subpicture unit, sequence, and the like. Thus, the current image may be one of these various levels. Further, the video encoding apparatus may determine, depending on these levels and according to various embodiments, the information of the mapping relationship to be transmitted (hereinafter the information is referred to as mapping data or mapping_data) and how to transmit the information. The mapping data may include all or part of a minimum value, a maximum value, a number of intervals, and the size of each interval, for the original samples that are the subject of the mapping. Further, the mapping data may include, for the mapping samples, a minimum value, a maximum value, a number of intervals, and the size of each interval in whole or in part. The size of each of the intervals that divide between the maximum sample value and minimum sample value in the original range may or may not be the same. Further, the number of intervals dividing the mapping range may be the same as the number of intervals in the original range. However, the size of each of the intervals that divide the mapping range may or may not be the same.

The video encoding apparatus may divide the span between the maximum and minimum values in the original range into n intervals, as shown in the example of FIG. 7, and may define a mapping relationship between the original samples and the mapping samples for each interval. The video encoding apparatus may transfer the defined mapping relationship and the defined inverse mapping relationship to the video decoding apparatus by transmitting mapping data including the minimum value of the original sample, the number of intervals, the size of each interval, and the size of the mapping interval corresponding to each original interval.

The video encoding apparatus may transfer the mapping data 'mapping_data' to the video decoding apparatus by using syntax as illustrated in Table 1.

TABLE 1

|  | case 1 | case 2 |
| --- | --- | --- |
| mapping data( ) |  |  |
| min_value | ue(v) | se(v) |
| num_interval | ue(v) | se(v) |
| for(i=min_value;i<num_interval;i++) |  |  |
| delta_value[i] | ue(v) | se(v) |
| mapping_delta_value[i] | ue(v) | se(v) |

Here, ue(v) and se(v) denote the syntax elements in the form of unsigned integers and signed integers, respectively, to which the exponential Golomb encoding scheme is applied.

In case 1 of Table 1, the syntax element min_value represents the smallest value among the values of the original samples. Depending on the embodiment, min_value may refer to a direct pixel value or may refer to an index. If min_value refers to an index, the video encoding apparatus may divide the original range into a preset number of A and may transmit the index of the interval corresponding to (or containing) the minimum value. Then, the index of the interval and the size of the interval may be used to calculate the actual pixel value.

In another embodiment, the min_value may be a difference value of the prediction, as in case 2 of Table 1. The video encoding apparatus may predict a minimum value of an image already decoded before the current image as a minimum value of the current image, may calculate a difference value between the predicted minimum value and the minimum value of the current image, and may transmit the calculated difference value. The video decoding apparatus may, in the same manner as the video encoding apparatus, predict the minimum value of the already decoded video as the minimum value of the current image and then may sum the predicted minimum value and the difference value to determine the min_value. The transmission of the difference value may be applied to both the case of transferring pixel values and the case of transferring indexes. In this case, the already decoded image used for prediction may be determined in various partitioned units depending on the transmission unit or referencing scheme of the mapping_data.

Depending on the unit of transmission of the mapping_data, the predicted minimum value may be a pixel value or index corresponding to the minimum value of the picture, subpicture, or slice that is decoded and immediately preceding in decoding chronological order. Alternatively, the predicted minimum may be the pixel value or index corresponding to the minimum value of the first picture in a group of pictures (GOP) containing the current picture. If the first picture in the GOP is an instantaneous decoding refresh (IDR), the video encoding apparatus may leave the predicted minimum value set to zero, may calculate and transmit a predicted difference value, or may skip any prediction process to transmit the pixel value or index corresponding to the minimum value.

In another embodiment, if mapping_data is transmitted more than once for one encoding sequence, the video encoding apparatus may use the previously transmitted mapping_data for prediction. The video encoding apparatus may predict a minimum value by using the minimum value determined by the previously transmitted mapping_data, may calculate a difference value between the predicted minimum value and the minimum value of the current image, and may transmit the difference value as min_value as described above. The video decoding apparatus may use the previously determined minimum value and the transmitted predicted difference value to determine a minimum value of the mapping_data of the current image.

When transmitting the predicted difference value, the min_value may have a sign. In some embodiments, the sign and absolute value of the difference value may be separated, and each may be transmitted as a separate syntax element.

In another embodiment, the transmission of the min_value may be omitted if the min_value is determined to be a value preset by an agreement between the video encoding apparatus and the video decoding apparatus.

Meanwhile, the minimum value of the mapping samples may be set to zero, as illustrated in FIG. 7. Alternatively, a preset value agreed between the video encoding apparatus and the video decoding apparatus may be utilized as the minimum value of the mapping samples.

The syntax element num_interval indicates the number n of original intervals, obtained by dividing the original range between the minimum and maximum values.

Additionally, num_interval may be the difference value of the prediction, as in case 2 of Table 1.

The video encoding apparatus may predict the number of intervals of the video already decoded before the current image as the number of intervals of the current image, may calculate a difference value between the number of predicted intervals and the number of intervals of the current image, and may transmit the calculated difference value. The video decoding apparatus may, in the same manner as the video encoding apparatus, predict the number of already decoded video intervals as the number of current image intervals and may sum the predicted minimum value and the difference value to determine num_interval. At this time, the already decoded image used for prediction may be determined in various partitioned units according to the transmission unit or referencing scheme method of mapping_data.

The predicted value of the number of intervals may be the number of intervals of the picture, subpicture, or slice that is decoded and immediately preceding in decoding chronological order, depending on the unit of transmission of the mapping_data. Alternatively, the predicted value may be the number of intervals of the first picture in the GOP containing the current picture. If the first video in the GOP is an IDR, the video encoding apparatus may leave the predicted value set to zero, may calculate and transmit a predicted difference value, or may skip any prediction process to transmit the number of intervals.

In another embodiment, if mapping_data is transmitted more than once for a single encoding sequence, the video encoding apparatus may use the previously transmitted mapping_data for prediction. The video encoding apparatus may generate a predicted value by using the number of intervals determined by the previously transmitted mapping_data, may calculate a difference value between the predicted value and the number of intervals of the current image, and may transmit the difference value as num_interval as described above. The video decoding apparatus may use the previously determined number of intervals and the transmitted prediction difference value to determine the number of intervals of the mapping_data of the current image.

In transmitting a predicted difference value, num_interval may have a sign. In some embodiments, the sign and absolute value of the difference value may be separated, and each may be sent as a separate syntax element.

In another embodiment, the transmission of num_interval may be omitted if the value of num_interval is fixed to a preset value based on an agreement between the video encoding apparatus and the video decoding apparatus. Additionally, in the example of FIG. 7, if min_value and max_value are fixed as maximum and minimum values according to the bit depth of the image, and each interval has the same size, the transmission of num_interval may be omitted.

The syntax element delta_value represents the size of each interval in the original range. The size of each interval may be set in pixel values. If each interval has a different size, as many delta_values need to be transferred as the number of the intervals. On the other hand, if each interval has the same size, the same size value may be transferred only once, as shown in Table 2, which is described below.

As another embodiment, the delta_value may be the difference value between the size of the i-th interval and the size of the (i−1)th interval, as shown in case 2 of Table 1. When transmitting a difference value, delta_value may have a sign. In some embodiments, the sign and absolute value of the difference value may be separated, and each may be transmitted as a separate syntax element.

The syntax element mapping_delta_value indicates the size of the mapping interval corresponding to each interval in the original range. The size of each mapping interval may be set in pixel values.

As another embodiment, the mapping_delta_value may be the difference value between the size of the i-th interval and the size of the (i−1)th interval, as shown in case 2 of Table 1. When transmitting a difference value, the mapping_delta_value may have a sign. In some embodiments, the sign and absolute value of the difference value may be separated, and each may be transmitted as a separate syntax element.

In yet another embodiment, the mapping_delta_value may be a predicted difference value generated from a predicted value of the size of the mapping interval. The video decoding apparatus may generate the difference value by regarding the size of the corresponding original interval as the predicted value to predict the size of the i-th mapping interval and then may transmit the difference value. For example, the interval size for delta_value0 is assumed to be 10, the interval size for delta_value1 is assumed to be 12, and the size of the mapping interval corresponding to the relevant interval is assumed to be 15. If the delta_value is represented by case 2 in Table 1, the video encoding apparatus may calculate that the difference value delta_value1 is 2 and the difference value mapping_delta_value1 is 3 and may transmit them. On the other hand, the video decoding apparatus may determine the size of the mapping_delta_value1 interval to be (delta_value0+delta_value1+mapping_delta_value1).

The video encoding apparatus may calculate a mapping sample value corresponding to an original sample value by using a linear relationship for each interval as a mapping relationship, as illustrated in FIG. 7. The linear relationship for each interval may be defined by a starting point for each interval and a slope between each mapping interval and the original interval (hereinafter, "interval slope"). The starting point may be calculated based on the min_value, the size of each original interval, and the size of each mapping interval. Further, the interval slope may be calculated based on the size of the original interval, and the size of the corresponding mapping interval.

On the other hand, the distinction between case 1 and case 2 as illustrated in Table 1 and the explanation thereof are for illustrative purposes only. For example, the video encoding apparatus may apply a mixture of case 1 and case 2, such as by applying case 1 to min_value and case 2 to num_interval.

As another embodiment, if each interval has the same size as described above, the video encoding apparatus may transfer the mapping data 'mapping_data' to the video decoding apparatus by using syntax as illustrated in Table 2.

TABLE 2

| mapping_data( ) | |
|---|---|
| min_value | ue(v) |
| delta_value | ue(v)/se(v) |
| num_interval | ue(v) |
| for(i=min_value;i<num_interval;i++) | |
| mapping_delta_value[i] | ue(v) |

Wherein, the syntax element 'delta_value' represents the size of the same interval.

In another embodiment, delta_value may be a difference value. For example, if mapping_data is transmitted more than once for one encoding sequence, the video encoding apparatus may utilize the previously transmitted mapping_data for calculating the difference value of delta_value. The video encoding apparatus may predict the size of each interval of the current image by using the size of each interval determined by the previously transmitted mapping_data, may calculate a difference value between the size of each interval predicted and the size of each interval of the current image, and may transmit the difference value as delta_value. The video decoding apparatus may use the previously determined size of each interval and the transmitted difference value to determine the size of each interval for the mapping_data of the current image.

In the case of transmitting a difference value, the delta_value may have a sign. In some embodiments, the sign and absolute value of the difference value may be separated, and each may be transmitted as a separate syntax element.

Figure 8:
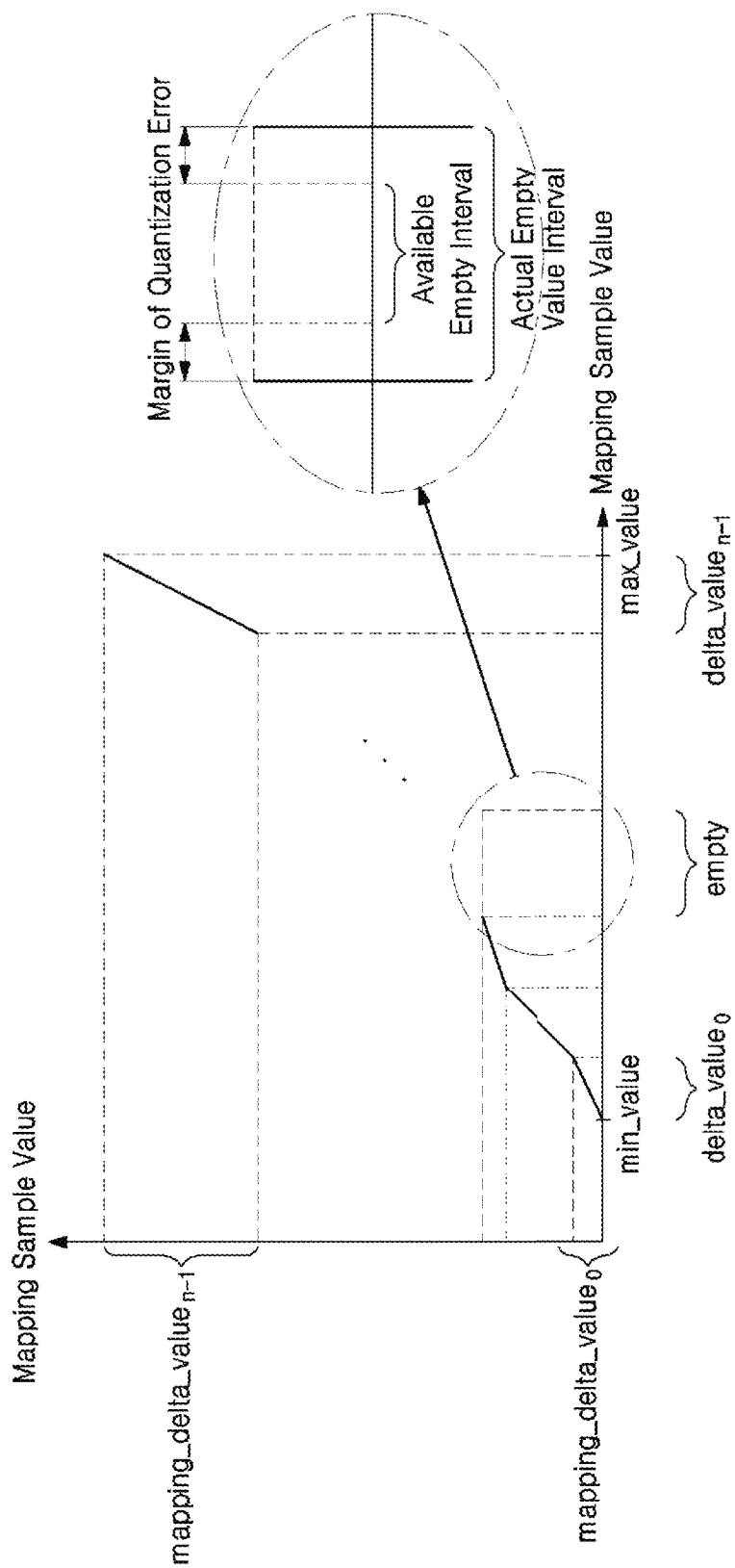
FIG. 8 is a diagram illustrating a mapping relationship according to another embodiment of the present disclosure.

FIG. 8 is a diagram illustrating a mapping relationship according to another embodiment of the present disclosure.

In the example of FIG. 8, an empty interval represents an original interval that lacks a mapping sample value corresponding to the source sample value.

In yet another embodiment, if such an empty interval exists, the video encoding apparatus may transfer the mapping data 'mapping data' to the video decoding apparatus by using syntax as illustrated in Table 3.

TABLE 3

```
mapping_data( )
    min_value                               ue(v)
    num_interval                            ue(v)
    for(i=0,j=0;i<num_interval;i++)
        delta_value[i]                      ue(v)
        mapping_flag[i]                     u(1)
        if(mapping_flag)
            mapping_delta_value[j]          ue(v)
            j++
```

Where u(1) represents a syntax element in the form of a 1-bit unsigned integer.

The syntax element mapping_flag indicates the presence or absence of a mapping interval corresponding to each of the original intervals. The video encoding apparatus transmits a mapping_delta_value when the mapping_flag is 1. Therefore, if empty intervals are present, the number of original intervals and the number of mapping intervals may be unequal. In this embodiment, the video encoding apparatus may set the empty intervals by considering the presence or absence of actual pixel values and the quantization error due to the quantization parameters, as illustrated in FIG. 8.

The predictor 120 may use a combination of intra prediction and inter prediction for the current block which is the prediction unit. In this case, the intra prediction-induced predicted signals and the inter prediction-induced predicted signals may be combined into final predicted signals based on filtering (e.g., weighted sum). In another embodiment, if the current block is divided into subblocks, the predictor 120 may apply at least one of the intra prediction and inter prediction methods to each subblock.

When applying the deblocking filter 182 as described above, the video encoding apparatus may utilize a strong filter or a weak filter, depending on the strength of the filtering. The video encoding apparatus may utilize a mapping relationship in determining the presence or absence of deblocking filtering and the strength of the filtering.

The pixel values being filtered are possibly in the same interval, i.e., the same delta_value interval, which means that the pixel values are mapped and inversely mapped by the same slope. In one embodiment, a strong filter may be utilized if the pixel values of the boundary being deblocked-filtered fall in different delta_value intervals. In another embodiment, if the interval slope is less than 1, i.e., if delta_value intervals in the original range are mapped to mapping_delta_value intervals in a narrower range, a strong filter may be employed, assuming the occurrence of an error due to mapping in addition to the quantization error.

In applying the deblocking filter, the video encoding apparatus may process in parallel a plurality of vertical boundaries when performing vertical filtering. Further, in performing horizontal filtering, a plurality of horizontal boundaries may be processed in parallel.

When applying the SAO filter 184 as described above, the video encoding apparatus may use the mapping relationship to determine the presence or absence of offset correction or the strength of the offset correction. For example, no offset correction may be performed if the slope of the mapping interval containing the samples to be offset corrected is less than one.

Another embodiment may determine, as the final correction value, a value obtained by multiplying the correction value by a weight determined according to the interval slope of the interval containing the samples subject to offset correction and may utilize the determined final correction value for performing the offset correction. Alternatively, if the interval slope is greater than 1, the final correction value may be determined by multiplying the correction value by a weight determined according to the interval slope containing the samples subject to offset correction, and the determined final correction value may be used to perform the offset correction. Alternatively, if the interval slope is less than 1, the final correction value may be determined by multiplying the correction value by a weight determined according to the interval slope containing the samples subject to offset correction, and the determined final correction value may be used to perform the offset correction.

Figure 9:
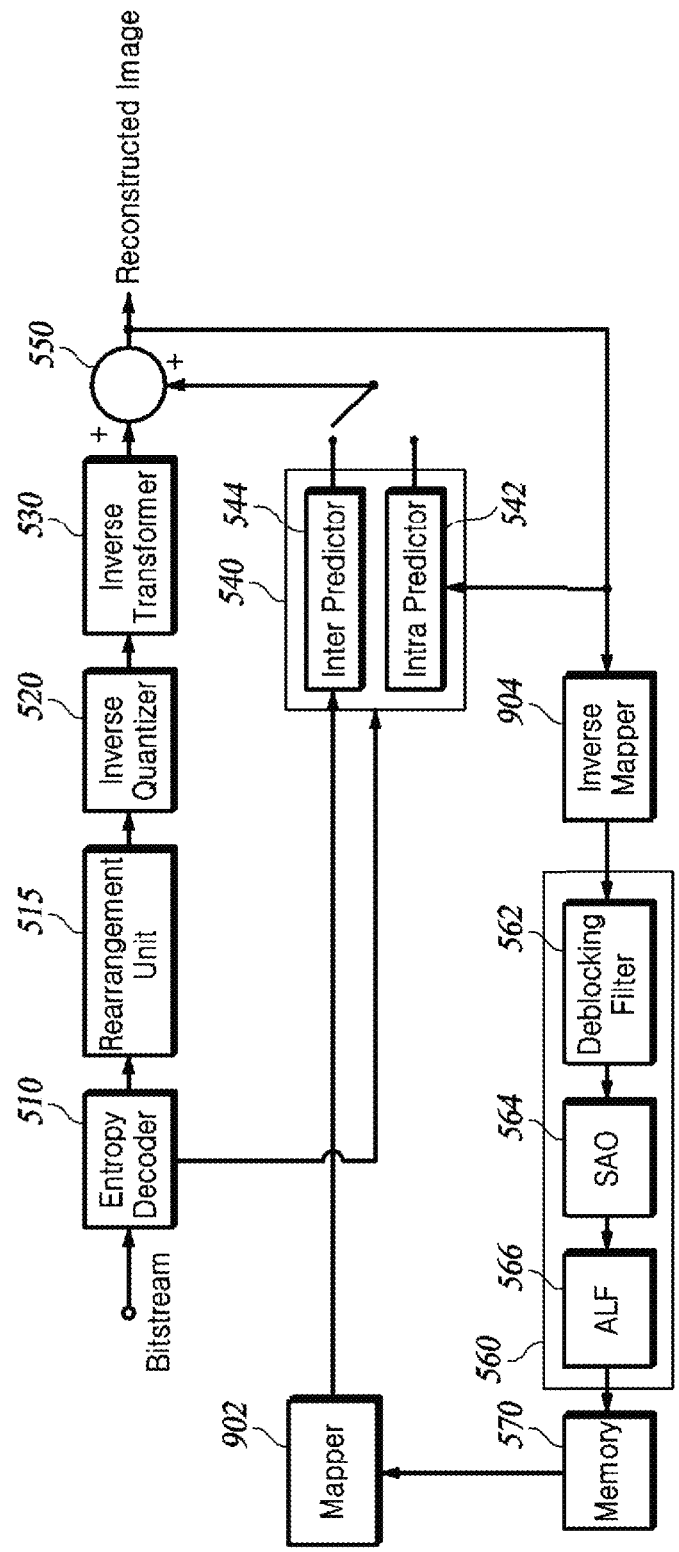
FIG. 9 is a block diagram conceptually illustrating a mapping-based video decoding apparatus, according to at least one embodiment of the present disclosure.

FIG. 9 is a block diagram conceptually illustrating a mapping-based video decoding apparatus, according to at least one embodiment of the present disclosure.

The video decoding apparatus according to the present embodiment performs adaptive mapping of luma and chroma samples and utilizes the mapped luma and chroma samples to perform decoding of the current block. Further to the components included in the embodiment illustrated in FIG. 5, the video decoding apparatus may include a mapper 902 and an inverse mapper 904. The following discussion will focus on components that are related to mapping-based decoding or add functionality.

In response to a reference picture, the mapper 902 utilizes a mapping relationship of the reference picture to map reference samples to sample values in a mapping range. For example, where the video encoding apparatus utilizes a different mapping relationship for each picture to encode each picture and transmits that mapping relationship, the video decoding apparatus may map a reference picture with the utilized mapping relationship while decoding the reference picture.

The mapped reference picture is transferred to the inter predictor 544. The inter predictor 544 utilizes the motion vector to generate a prediction block of the current block in the reference picture. Meanwhile, sample values in the mapping range delivered from the video encoding apparatus are used by the entropy decoder 510, the inverse quantizer 520, the inverse transformer 530, and the intra predictor 542.

In response to the reconstructed block generated by the adder 550, the inverse mapper 904 utilizes an inverse mapping relationship to inversely map the reconstructed sample values to the sample values in the original range. As described above, when different mapping relationships are utilized for each picture, the mapping relationship corresponding to the inverse mapping relationship utilized by the inverse mapper 904 might be different from the mapping relationship of the reference picture utilized by the mapper 902.

The sample values in the original range, generated by the inverse mapper 904, are filtered by the loop filter unit 560 and stored in the memory 570, as illustrated in FIG. 9.

On the other hand, the mapping relationship and the inverse mapping relationship described above may be transmitted from the video encoding apparatus to the video decoding apparatus as information on the mapping relationship, i.e., mapping data 'mapping_data'. Thus, the video decoding apparatus may decode the current block by using the mapping_data as illustrated in Table 1, Table 2, and Table 3. Since the mapping_data illustrated in Table 1 to Table 3 have already been described, further description thereof is omitted.

As mentioned above, in the reference picture selection step performed by the video decoding apparatus, the reference picture may have separate mapping_data. To this end, the video decoding apparatus may manage the mapping_data of the reference picture along with at least one data item of an index or a picture of count (POC) of the reference picture. In another embodiment, the video encoding apparatus may transmit the one or more items of mapping_data in the form of a list, and the video decoding apparatus may manage the mapping_data of the reference picture by using an index of the relevant list.

On the other hand, the predictor 540 may use a combination of intra prediction and inter prediction for the current block which is the prediction unit. In this case, the predicted signals based on the intra prediction and the predicted signals based on the inter prediction may be combined into final predicted signals based on filtering (e.g., weighted sum). In another embodiment, where the current block is divided into subblocks, the predictor 540 may apply the prediction scheme of at least one of the intra prediction and inter prediction to each subblock.

When applying the deblocking filter 562 as described above, the video decoding apparatus may utilize a strong filter or a weak filter depending on the filtering strength. The video decoding apparatus may utilize a mapping relationship in determining the presence or absence of deblocking filtering and the strength of the filtering.

In one embodiment, a strong filter may be utilized when the pixel values of the boundary being deblocking filtered fall within different delta_value intervals. In another embodiment, when the interval slope is less than 1, i.e., when delta_value intervals in the original range are mapped to mapping_delta_value intervals in a narrower range, a strong filter may be used, assuming that an error due to mapping is introduced in addition to quantization error.

In applying the deblocking filter 562, the video decoding apparatus may process in parallel a plurality of vertical boundaries when performing vertical directional filtering. Additionally, when performing horizontal directional filtering, a plurality of horizontal boundaries may be processed in parallel.

When applying the SAO filter 564 as described above, the video decoding apparatus may use the mapping relationship to determine the presence or absence of offset correction or the strength of the offset correction. For example, no offset correction may be performed if the slope of the mapping interval containing the samples subject to offset correction is less than one.

Another embodiment may determine, as the final correction value, a value obtained by multiplying the correction value by a weight determined according to the interval slope of the interval containing the samples subject to offset correction and may utilize the determined final correction value for performing the offset correction. Alternatively, if the interval slope is greater than 1, the final correction value may be determined by multiplying the correction value by a weight determined according to the interval slope containing the samples subject to offset correction, and the determined final correction value may be used to perform the offset correction. Alternatively, if the interval slope is less than 1, the final correction value may be determined by multiplying the correction value by a weight determined according to the interval slope containing the samples subject to offset correction, and the determined final correction value may be used to perform the offset correction.

On the other hand, the example implementations illustrated in FIGS. 6 and 9 may be equally applicable to the luma component and the chroma component. In this case, mapping_data may be transmitted based on each component, from the video encoding apparatus to the video decoding apparatus. Additionally, if the embodiments apply to only one of the luma component or the chroma component, the mapping_data for that component may be transmitted from the video encoding apparatus to the video decoding apparatus.

Figure 10:
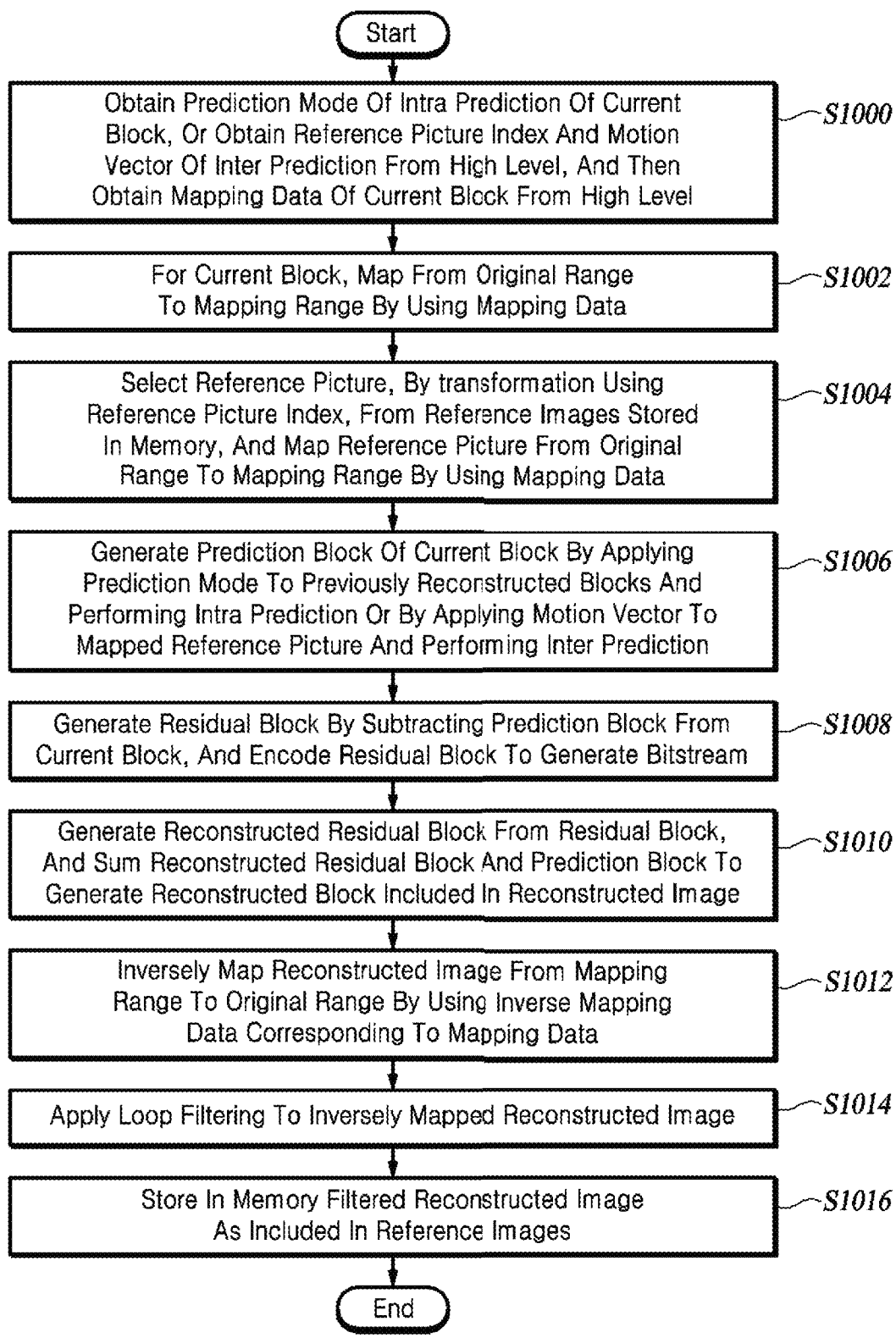
FIG. 10 is a flowchart of a mapping-based video encoding method, according to at least one embodiment of the present disclosure.

FIG. 10 is a flowchart of a mapping-based video encoding method, according to at least one embodiment of the present disclosure.

The video encoding apparatus obtains the prediction mode of the intra prediction of the current block or obtains the reference picture index and motion vector of the inter prediction from the high level, and then the video encoding apparatus obtains the mapping data of the current block from the high level (S1000).

In terms of performing the rate distortion optimization, the video encoding apparatus may obtain the prediction mode of the intra prediction or may obtain the reference picture index and the motion vector of the intra prediction, from the high level.

The mapping data may include, for the current image containing the current block, as the components thereof, all or part of a minimum value in the original range, a number of intervals from dividing the original range, a size of each interval, and a size of each mapping interval corresponding to each interval.

As another embodiment, the mapping data may include all or some of the aforementioned components in the form of difference values.

For the current block, the video encoding apparatus maps from the original range to the mapping range by using the mapping data (S1002).

The video encoding apparatus selects a reference picture, by using a reference picture index, from the reference pictures stored in the memory and maps the reference picture from the original range to the mapping range by using the mapping data (S1004).

When different mapping relationships are utilized for each picture, the mapping data utilized for the current block may be different from the mapping data utilized for the reference picture.

The video encoding apparatus generates a prediction block of the current block by applying a prediction mode to the previously reconstructed blocks and thereby performing intra prediction, or by applying the motion vector to the mapped reference picture and thereby performing inter prediction (S1006).

The video encoding apparatus generates a residual block by subtracting the prediction block from the current block and encodes the residual block to generate a bitstream (S1008). To generate the bitstream, the video encoding apparatus may apply all or part of a transform, quantization, and entropy encoding to the residual block.

The video encoding apparatus generates a reconstructed residual block from the residual block and sums the reconstructed residual block and the prediction block to generate a reconstructed block that is included in the reconstructed image (S1010). To generate the reconstructed block, the video encoding apparatus may apply all or part of the transform, quantization, inverse quantization, and inverse transform to the residual block.

The video encoding apparatus inversely maps the reconstructed image from the mapping range to the original range by using inverse mapping data corresponding to the mapping data (S1012).

The video encoding apparatus applies loop filtering to the inversely mapped reconstructed image (S1014).

The video encoding apparatus stores, in the memory, the filtered reconstructed image as included in the reference images (S1016).

Figure 11:
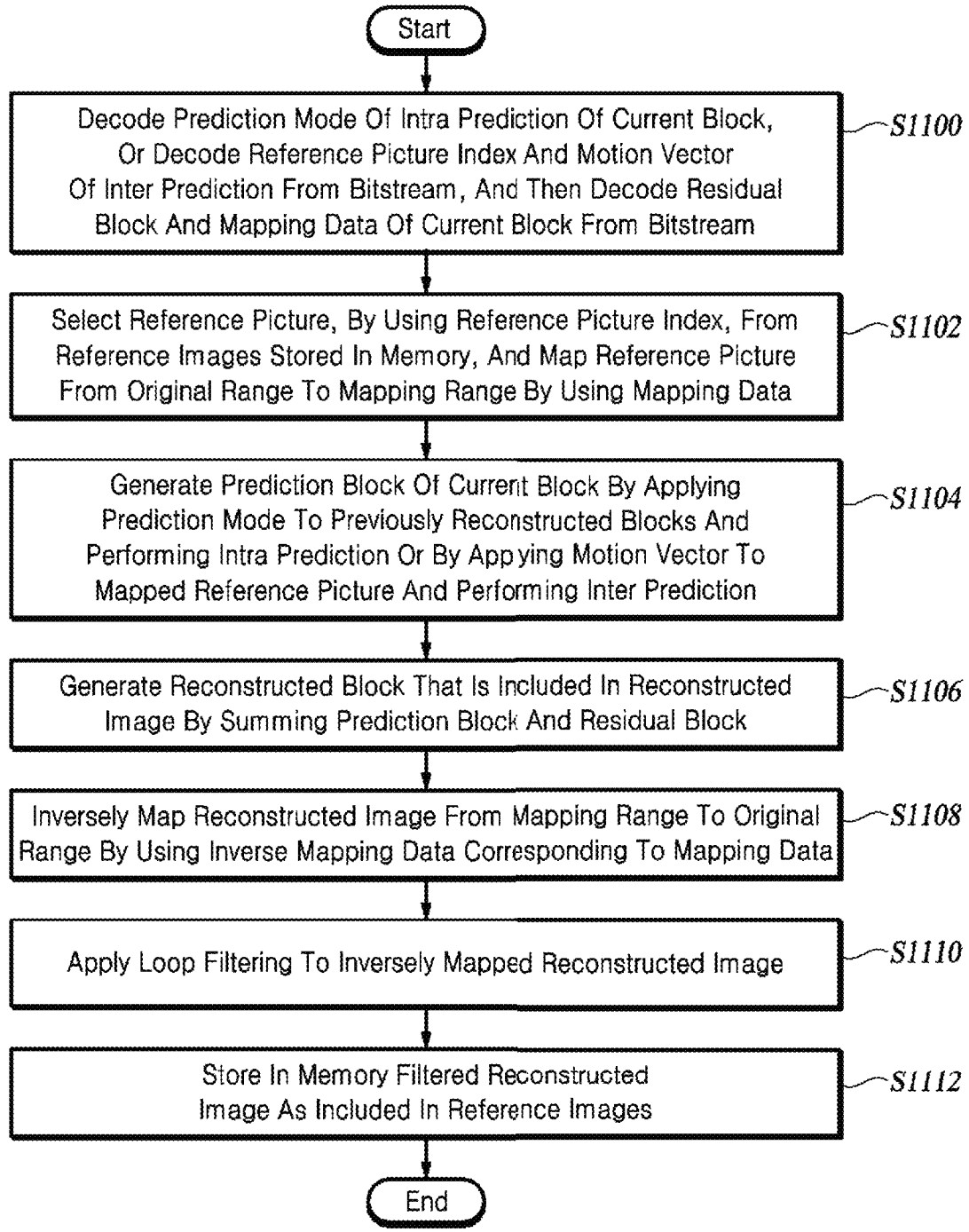
FIG. 11 is a flowchart of a mapping-based video decoding method, according to at least one embodiment of the present disclosure.

FIG. 11 is a flowchart of a mapping-based video decoding method, according to at least one embodiment of the present disclosure.

The video decoding apparatus decodes the prediction mode of the intra prediction of the current block or decodes the reference picture index and motion vector of the inter prediction from the bitstream, and then the video decoding apparatus decodes the residual block and mapping data of the current block from the bitstream (S1100).

The mapping data may include, for the current image containing the current block, as the components thereof, all or some of a minimum value in the original range, a number of intervals from dividing the original range, a size of each interval, and a size of each mapping interval corresponding to each interval.

In another embodiment, the mapping data may include all or some of the aforementioned components in the form of difference values.

The video decoding apparatus selects a reference picture, by using a reference picture index, from the reference images stored in the memory and maps the reference picture from the original range to the mapping range by using the mapping data (S1102).

The video decoding apparatus generates a prediction block of the current block by applying a prediction mode to the previously reconstructed blocks, thus performing intra prediction, or by applying a motion vector to the mapped reference picture and thereby performing inter prediction (S1104).

The video decoding apparatus sums the prediction block and the residual block to generate a reconstructed block that is included in the reconstructed image (S1106).

The video decoding apparatus inversely maps the reconstructed image from the mapping range to the original range by using the inverse mapping data corresponding to the mapping data (S1108).

On the other hand, when utilizing different mapping data for each picture, the mapping data utilized for the reconstructed image of the current picture may be different from the mapping data utilized for the reference picture.

The video decoding apparatus applies loop filtering to the inversely mapped reconstructed image (S1110).

The video decoding apparatus stores, in the memory, the filtered reconstructed image as included in the reference pictures (S1112).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure is not to be limited by the above explicitly described embodiments but by the claims and equivalents thereof.

| (Reference Numerals) | |
|---|---|
| 120: predictor | 542: intra predictor |
| 544: inter predictor | 602: first mapper |
| 604: second mapper | 606: inverse mapper |
| 902: mapper | 904: inverse mapper |

What is claimed is:

1. A video decoding apparatus, comprising:
an entropy decoder configured to decode a prediction mode of an intra prediction of a current block, or to decode a reference picture index and a motion vector of an inter prediction from a bitstream, and then decode a residual block and mapping data of the current block from the bitstream;
a mapper configured to map a reference picture from an original range to a mapping range by using the mapping data, wherein the reference picture is selected based on the reference picture index from reference images;
a predictor configured to generate a prediction block of the current block by applying the prediction mode to previously reconstructed blocks and performing the intra prediction or by applying the motion vector to a mapped reference picture and performing the inter prediction;
an adder configured to sum the prediction block and the residual block to generate a reconstructed block to be included in a reconstructed image;
an inverse mapper configured to inversely map the reconstructed image from the mapping range to the original range by using inverse mapping data corresponding to the mapping data;
a loop filter unit configured to perform loop filtering on an inversely mapped reconstructed image, wherein the loop filtering comprises a deblocking filter and an offset filter; and a memory configured to store a filtered reconstructed image as included in the reference images, wherein the mapping data includes, for a current image comprising the current block, a minimum value in the original range, and wherein, when the mapping data comprises a difference value of the minimum value, the current image has a minimum value that is determined by taking, for a predicted minimum value of the current image, a minimum value determined by previously transmitted mapping data when the mapping data is transmitted more than once for one encoding sequence and then by summing the predicted minimum value and the difference value of the minimum value.

2. The video decoding apparatus of claim 1, wherein the mapping data further comprises, for the current image comprising the current block, as components, all or part of a number of intervals from dividing the original range, a size of each interval, and a size of each mapping interval corresponding to each of the intervals, and wherein all or part of the components are difference values.

3. The video decoding apparatus of claim 2, wherein, when the mapping data comprises a difference value of the minimum value, the current image has a minimum value that is determined by taking a minimum value of an already decoded image for a predicted minimum value of the current image and then summing the predicted minimum value and the difference value of the minimum value.

4. The video decoding apparatus of claim 3, wherein the predicted minimum value is a minimum value of a picture, subpicture, or slice that is decoded and immediately preceding in decoding chronological order, or a minimum value of a first picture in a GOP containing the current image, depending on a transmission unit of the mapping data.

5. The video decoding apparatus of claim 2, wherein, when the mapping data comprises a difference value of the number of the intervals, the number of intervals is determined by taking a number of intervals of an already decoded image for a number of predicted intervals of the current image and then summing the number of the predicted intervals and the difference value of the number of the intervals.

6. The video decoding apparatus of claim 2, wherein, when the mapping data comprises a difference value of the size of each of the intervals, the size of each of the intervals is a difference value between a size of a current interval and a size of a previous interval.

7. The video decoding apparatus of claim 2, wherein, when the mapping data comprises a difference value of the size of each of mapping intervals, the size of each of the mapping intervals is a difference value between a size of a current mapping internal and a size of a previous mapping interval.

8. The video decoding apparatus of claim 2, wherein, when the mapping data comprises a difference value of the size of each of mapping intervals, the size of each of the mapping intervals is determined by taking a size of a corresponding interval within the original range for a predicted size of the mapping interval of the current image and then summing the predicted size of the mapping interval and the difference value of the size of each of the mapping intervals.

9. The video decoding apparatus of claim 2, wherein, when each of the intervals has an equal size, the mapping data comprises: a single value as the size of each interval.

10. The video decoding apparatus of claim 2, wherein, for each of the intervals, the mapping data comprises:
a flag for use to distinguish a presence or absence of an empty interval that lacks a mapping sample value corresponding to an original sample value.

11. The video decoding apparatus of claim 1, wherein, when different mapping data is utilized for each picture, the mapping data utilized by the inverse mapper is different from mapping data utilized by the mapper.

12. The video decoding apparatus of claim 2, wherein the deblocking filter is configured to use the mapping data to determine whether or not a deblocking filtering is present and a type of the deblocking filtering.

13. The video decoding apparatus of claim 2, wherein the offset filter is configured to use the mapping data to determine whether or not an offset correction is present or strength of the offset correction.

14. A video encoding method performed by a computing device, the video encoding method comprising:
obtaining a prediction mode of an intra prediction of a current block, or obtaining a reference picture index and a motion vector of an inter prediction from a high level, and then obtaining mapping data of the current block from the high level;
mapping from an original range to a mapping range by using the mapping data, for the current block;
selecting a reference picture from reference images stored in a memory by using the reference picture index, and mapping the reference picture from an original range to a mapping range by using the mapping data;
generating a prediction block of the current block by applying the prediction mode to previously reconstructed blocks and performing the intra prediction, or by applying the motion vector to a mapped reference picture and performing the inter prediction;
generating a residual block by subtracting the prediction block from the current block, generating a bitstream by encoding the residual block, generating a reconstructed residual block from the residual block, and generating a reconstructed block included in a reconstructed image by summing the reconstructed residual block and the prediction block;
inversely mapping the reconstructed image from the mapping range to the original range by using inverse mapping data corresponding to the mapping data;
applying loop filtering to an inversely mapped reconstructed image; and
storing in the memory a filtered reconstructed image as included in the reference images,
wherein the mapping data includes, for a current image comprising the current block, a minimum value in the original range, and
wherein, when the mapping data comprises a difference value of the minimum value, the current image has a minimum value that is determined by taking, for a predicted minimum value of the current image, a minimum value determined by previously transmitted mapping data when the mapping data is transmitted more than once for one encoding sequence and then by summing the predicted minimum value and the difference value of the minimum value.

15. The video encoding method of claim 14, wherein, for the current image including the current block, the mapping data further comprises as components, all or part of a number of intervals from dividing the original range, a size of each interval, and a size of each mapping interval corresponding to each of the intervals, and wherein all or part of the components are difference values.

16. The video encoding method of claim 15, wherein, when different mapping data is used for each picture, the mapping data used for the current block is different from mapping data used for the reference picture.

17. A method for providing video data to a video decoding device, the method comprising:
- encoding the video data into a bitstream; and
- transmitting the bitstream to the video decoding device, wherein encoding the video data comprises:
    - obtaining a prediction mode of an intra prediction of a current block, or obtaining a reference picture index and a motion vector of an inter prediction from a high level, and then obtaining mapping data of the current block from the high level;
    - mapping from an original range to a mapping range by using the mapping data, for the current block;
    - selecting a reference picture from reference images stored in a memory by using the reference picture index, and mapping the reference picture from an original range to a mapping range by using the mapping data;
    - generating a prediction block of the current block by applying the prediction mode to previously reconstructed blocks and performing the intra prediction, or by applying the motion vector to a mapped reference picture and performing the inter prediction;
    - generating a residual block by subtracting the prediction block from the current block, generating a bitstream by encoding the residual block, generating a reconstructed residual block from the residual block, and generating a reconstructed block included in a reconstructed image by summing the reconstructed residual block and the prediction block;
    - inversely mapping the reconstructed image from the mapping range to the original range by using inverse mapping data corresponding to the mapping data;
    - applying loop filtering to an inversely mapped reconstructed image; and
    - storing in the memory a filtered reconstructed image as included in the reference images,
- wherein the mapping data includes, for a current image comprising the current block, a minimum value in the original range, and
- wherein, when the mapping data comprises a difference value of the minimum value, the current image has a minimum value that is determined by taking, for a predicted minimum value of the current image, a minimum value determined by previously transmitted mapping data when the mapping data is transmitted more than once for one encoding sequence and then by summing the predicted minimum value and the difference value of the minimum value.

* * * * *